US010166996B2

(12) United States Patent
Ishihara et al.

(10) Patent No.: US 10,166,996 B2
(45) Date of Patent: Jan. 1, 2019

(54) SYSTEMS AND METHODS FOR ADAPTIVELY COMMUNICATING NOTICES IN A VEHICLE

(71) Applicant: Toyota Motor Engineering & Manufacturing North America, Inc., Erlanger, KY (US)

(72) Inventors: Mikiya Ishihara, Plano, TX (US); Yi Li, Ann Arbor, MI (US); Kazutoshi Ebe, Novi, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 52 days.

(21) Appl. No.: 15/428,379

(22) Filed: Feb. 9, 2017

(65) Prior Publication Data

US 2018/0222490 A1 Aug. 9, 2018

(51) Int. Cl.
*B60W 50/14* (2012.01)
*G06T 7/70* (2017.01)
(Continued)

(52) U.S. Cl.
CPC .............. *B60W 50/14* (2013.01); *B60K 35/00* (2013.01); *B60N 2/0228* (2013.01);
(Continued)

(58) Field of Classification Search
CPC ................ B60W 50/14; B60W 40/08; B60W 2050/143; B60W 2050/146; G06T 7/70; B60Q 3/745; B60Q 3/82; B60Q 1/2696; B60Q 1/346; B60K 35/00; B60K 2350/102; B60K 2350/1028; B60K 2350/1044; B60K 2350/1048; B60K 2350/106; B60K 2350/2013; B60K 2350/2052; B60K 2350/2095; B60K 2350/922; B60K 2350/965; B60N 2/0228; B60N 2/0232;
(Continued)

(56) References Cited

U.S. PATENT DOCUMENTS 7,206,435 B2 * 4/2007 Fujimura ............... A61B 3/113
 382/117
7,281,761 B2 10/2007 Brown et al.
(Continued)

*Primary Examiner* — Courtney D Heinle
(74) *Attorney, Agent, or Firm* — Christopher G. Darrow; Darrow Mustafa PC

(57) ABSTRACT

System, methods, and other embodiments described herein relate to adaptively communicating notices to passengers within a vehicle. In one embodiment, a method includes in response to receiving a notice about an occurrence of an event, determining a viewing orientation of a passenger in the vehicle according to at least one electronic input that indicates information about a physical position of the passenger within the vehicle. The event is an incident associated with the vehicle for which the passenger is to be informed. The method also includes selecting at least one alerting device from available communication devices in the vehicle according to the viewing orientation by determining which of the available communication devices correspond with the viewing orientation of the passenger. The method further includes controlling the at least one alerting device to communicate the notice to the passenger about the occurrence of the event.

20 Claims, 6 Drawing Sheets

(51) Int. Cl.
- *B60Q 3/74* (2017.01)
- *B60Q 3/82* (2017.01)
- *B60K 35/00* (2006.01)
- *B60N 2/02* (2006.01)
- *B60N 2/14* (2006.01)
- *B60N 2/22* (2006.01)
- *B60Q 1/26* (2006.01)
- *B60Q 1/34* (2006.01)
- *B60R 1/00* (2006.01)
- *B60W 40/08* (2012.01)
- *G05D 1/00* (2006.01)
- *G06K 9/00* (2006.01)

(52) U.S. Cl.
CPC ........... *B60N 2/0232* (2013.01); *B60N 2/143* (2013.01); *B60N 2/22* (2013.01); *B60Q 1/2696* (2013.01); *B60Q 1/346* (2013.01); *B60Q 3/745* (2017.02); *B60Q 3/82* (2017.02); *B60R 1/00* (2013.01); *B60W 40/08* (2013.01); *G05D 1/0061* (2013.01); *G05D 1/0088* (2013.01); *G06K 9/00832* (2013.01); *G06T 7/70* (2017.01); *B60K 2350/102* (2013.01); *B60K 2350/106* (2013.01); *B60K 2350/1028* (2013.01); *B60K 2350/1044* (2013.01); *B60K 2350/1048* (2013.01); *B60K 2350/2013* (2013.01); *B60K 2350/2052* (2013.01); *B60K 2350/2095* (2013.01); *B60K 2350/922* (2013.01); *B60K 2350/965* (2013.01); *B60R 2300/105* (2013.01); *B60R 2300/108* (2013.01); *B60R 2300/205* (2013.01); *B60R 2300/301* (2013.01); *B60R 2300/303* (2013.01); *B60R 2300/8033* (2013.01); *B60R 2300/8093* (2013.01); *B60W 2050/143* (2013.01); *B60W 2050/146* (2013.01); *B60Y 2400/92* (2013.01)

(58) Field of Classification Search
CPC .. B60N 2/143; B60N 2/22; B60R 1/00; B60R 2300/105; B60R 2300/108; B60R 2300/205; B60R 2300/301; B60R 2300/303; B60R 2300/8033; B60R 2300/8093; G05D 1/0061; G05D 1/0088; G06K 9/00832; B60Y 2400/92
See application file for complete search history.

(56) References Cited

U.S. PATENT DOCUMENTS

| | | | | |
|---|---|---|---|---|
| 8,390,440 | B2* | 3/2013 | Krautter | B60K 35/00 340/435 |
| 8,874,301 | B1* | 10/2014 | Rao | B60K 28/066 180/272 |
| 9,335,765 | B2* | 5/2016 | Pilutti | G05D 1/0061 |
| 2007/0280505 | A1* | 12/2007 | Breed | B60W 40/08 382/104 |
| 2009/0319095 | A1* | 12/2009 | Cech | B60K 35/00 701/1 |
| 2012/0092173 | A1* | 4/2012 | Sanchez | A61B 3/113 340/576 |
| 2012/0271484 | A1* | 10/2012 | Feit | B60W 30/09 701/1 |
| 2013/0342365 | A1* | 12/2013 | Kiefer | B60Q 9/008 340/901 |
| 2014/0129082 | A1* | 5/2014 | Takahashi | B60R 1/12 701/36 |
| 2014/0139341 | A1* | 5/2014 | Green | B60K 28/06 340/576 |
| 2014/0265480 | A1* | 9/2014 | Perrin | B60N 2/26 297/217.4 |
| 2015/0070160 | A1* | 3/2015 | Davidsson | B60W 50/14 340/457 |
| 2015/0077272 | A1* | 3/2015 | Pisz | B60K 37/06 340/905 |
| 2015/0081169 | A1* | 3/2015 | Pisz | B60H 1/00657 701/36 |
| 2015/0138044 | A1* | 5/2015 | Rawlinson | G06F 3/1454 345/2.2 |
| 2015/0251566 | A1 | 9/2015 | Cuddihy et al. | |
| 2015/0346718 | A1 | 12/2015 | Stenneth | |
| 2016/0039285 | A1* | 2/2016 | Mathieu | B60K 35/00 340/576 |
| 2016/0221500 | A1* | 8/2016 | Sakai | B60Q 9/008 |
| 2017/0028987 | A1* | 2/2017 | Yamada | B60W 50/08 |
| 2017/0060234 | A1* | 3/2017 | Sung | B60R 1/006 |
| 2017/0113702 | A1* | 4/2017 | Thieberger-Navon | B60W 50/14 |
| 2017/0267138 | A1* | 9/2017 | Subat | B60N 2/4876 |
| 2017/0329329 | A1* | 11/2017 | Kamhi | B60W 50/14 |
| 2018/0029501 | A1* | 2/2018 | Wolf | B60N 2/0224 |
| 2018/0065553 | A1* | 3/2018 | Badger, II | B60Q 9/008 |
| 2018/0086260 | A1* | 3/2018 | Barillot | B60Q 3/51 |
| 2018/0093675 | A1* | 4/2018 | Holub | A61B 5/02405 |
| 2018/0134282 | A1* | 5/2018 | Freienstein | B60W 30/08 |
| 2018/0134285 | A1* | 5/2018 | Cho | B60W 30/09 |
| 2018/0141570 | A1* | 5/2018 | Kimura | B60W 50/14 |

* cited by examiner

SYSTEMS AND METHODS FOR ADAPTIVELY COMMUNICATING NOTICES IN A VEHICLE

FIELD

The subject matter described herein relates in general to systems for providing notices and more particularly to systems for providing notices to passengers of a vehicle.

BACKGROUND

In modern vehicles, there are many systems that provide information to the passengers. For example, many vehicles include systems that monitor vehicle parameters, like vehicle speed, fuel level, and mileage. Moreover, as additional technologies are integrated with vehicles available information provided to passengers continues to grow. Furthermore, autonomous vehicles may include even more indications that are provided to passengers. However, when the vehicle is operating in an autonomous mode the passengers, particularly the driver, may become easily distracted or may otherwise not be paying attention to the operation of the vehicle or its surroundings. For example, the driver may rotate his seat to face other passengers in a back seat area or may direct attention to a display that is showing entertainment content. Consequently, difficulties arise with ensuring passengers including the driver are appropriately notified of various events.

SUMMARY

An example of an indication system for a vehicle that may operate in an autonomous mode is presented herein. The system can provide notices to a passenger of the vehicle as a function of the current position of a seat that supports the passenger, particularly when the vehicle is in an autonomous mode. This arrangement may be useful, given the possibility that a passenger may move the seat to a position that obstructs a view of a display for the passenger or some other component that is part of the primary instrument panel.

In one embodiment, an indication system of a vehicle includes one or more processors. The indication system also includes a memory communicably coupled to the one or more processors. The memory stores an orientation module and a notice module. The orientation module includes instructions that when executed by the one or more processors cause the one or more processors to, in response to receiving a notice about an occurrence of an event, determine a viewing orientation of a passenger in the vehicle according to at least one electronic input that indicates information about a physical position of the passenger within the vehicle. The event is an incident associated with the vehicle for which the passenger is to be informed. The orientation module further includes instructions to select at least one alerting device from available communication devices in the vehicle according to the viewing orientation by determining which of the available communication devices correspond with the viewing orientation of the passenger. The notice module includes instructions that when executed by the one or more processors cause the one or more processors to control the at least one alerting device to communicate the notice to the passenger about the occurrence of the event.

In another embodiment, a non-transitory computer-readable medium stores instructions that when executed by one or more processors cause the one or more processors to perform various functions. The instructions include instructions to, in response to receiving a notice about an occurrence of an event, determine a viewing orientation of a passenger in a vehicle according to at least one electronic input that indicates information about a physical position of the passenger within the vehicle. The event is an incident associated with the vehicle for which the passenger is to be informed. The instructions further include instructions to select at least one alerting device from available communication devices in the vehicle according to the viewing orientation by determining which of the available communication devices correspond with the viewing orientation of the passenger. The instructions include instructions to control the at least one alerting device to communicate the notice to the passenger about the occurrence of the event.

In one embodiment, a method includes in response to receiving a notice about an occurrence of an event, determining a viewing orientation of a passenger in the vehicle according to at least one electronic input that indicates information about a physical position of the passenger within the vehicle. The event is an incident associated with the vehicle for which the passenger is to be informed. The method also includes selecting at least one alerting device from available communication devices in the vehicle according to the viewing orientation by determining which of the available communication devices correspond with the viewing orientation of the passenger. The method further includes controlling the at least one alerting device to communicate the notice to the passenger about the occurrence of the event.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with adaptively communicating notices to passengers of a vehicle are disclosed herein. As mentioned in the background, because passengers of the vehicle may be inattentive to the operation of the vehicle and also inattentive to other events occurring around the vehicle, notifying the passengers about various events may be difficult. Accordingly, in one embodiment, the disclosed systems and methods are implemented to facilitate providing notices to passengers of the vehicle. In one embodiment, the disclosed systems and methods are implemented within a vehicle that operates in an autonomous mode since there is a tendency for passengers of a vehicle operating autonomously to be inattentive.

For example, an indication system uses information from various systems in the vehicle (e.g., seat position circuitry, mobile connectivity systems, eye tracking system, and so on) to determine a general orientation of a passenger. From this information, the indication system, in one embodiment, determines a general viewing direction of the passenger and/or whether the passenger is inattentive. Thereafter, the indication system selects one or more devices that are within the viewing direction of the passenger or that will otherwise notify the passenger. For example, the indication system selects from devices, such as monitors, mobile devices (e.g., smartphones), passenger compartment lighting, and speakers to communicate notices to the passenger. In other words, the indication system determines which device the passenger is most likely viewing and uses that device to communicate notices. In this way, the indication system controls the available devices that are best suited for providing notices to the passenger to communicate the notices according to a present orientation of the passenger.

Consider the following example. The vehicle is operating in an autonomous mode, and the passenger (i.e., driver) reclines in a seat to a substantially horizontal position. Additionally, the vehicle includes a monitor that is integrated within the roof of the passenger compartment, which the driver uses to view some form of entertainment while reclined. In view of this configuration, in one embodiment, the indication system adaptively directs visual and/or audio notices to the monitor in the roof when the seat is in this reclined position. Furthermore, multiple displays or other user interface elements may be strategically situated throughout the passenger compartment to align with the various possible positions of the seat and/or viewing orientations of the passengers. Consequently, the indication system adaptively selects devices according to a position of the passenger and provides notices to the selected devices. In this way, the notices are adaptively communicated to the passengers regardless of their viewing orientation.

Figure 1:
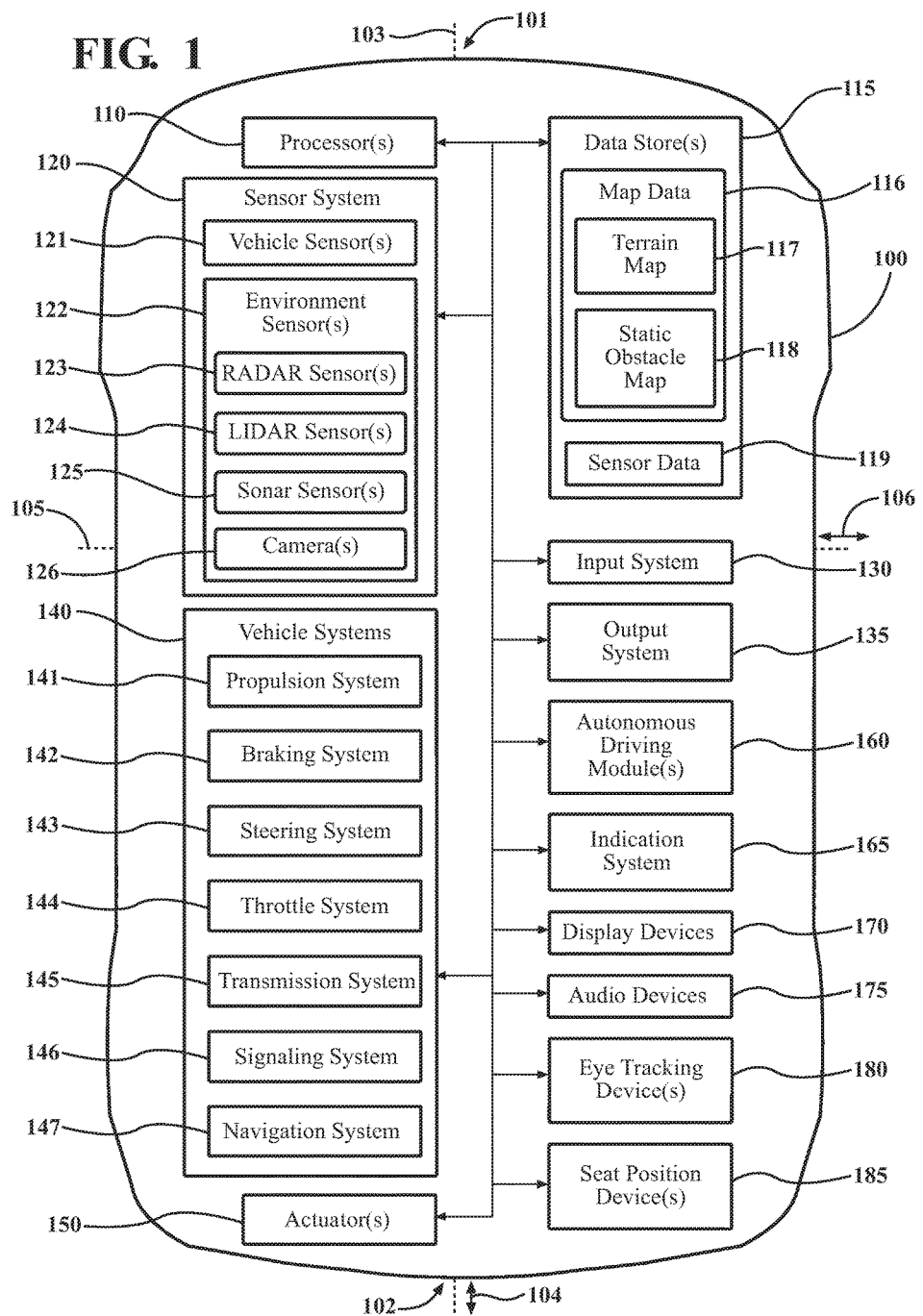
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle along a travel route using one or more computing systems to control the vehicle with minimal or no input from a human driver. Thus, as used herein, passenger can include both a driver/vehicle operator and other passengers of the vehicle 100. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator provides inputs to the vehicle to perform a portion of the navigation and/or maneuvering of the vehicle along a travel route.

Furthermore, the vehicle 100 has, for example, a forward end 101 and a rearward end 102. The vehicle 100 also includes various elements. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, the vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein can be practiced without these specific details. In either case, the vehicle 100 includes an indication system 165 that is implemented to perform methods and other functions as disclosed herein relating to adaptively communicating notices to passengers of the vehicle 100. The noted functions and methods will become more apparent with further discussion of the figures.

Figure 2:
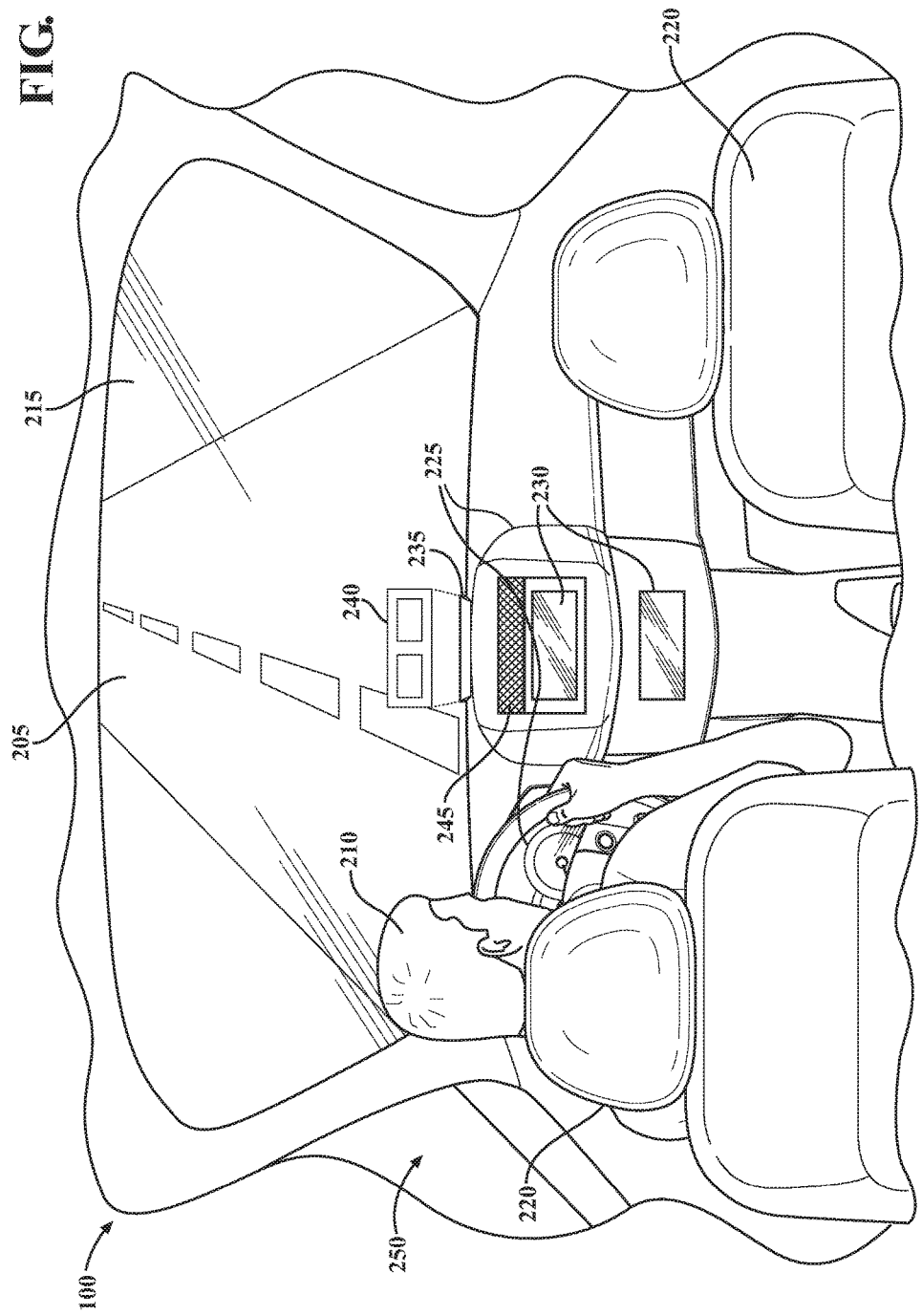
FIG. 2 illustrates one example of a forward section of the vehicle of FIG. 1.

Referring to FIG. 2, an example of a portion of the vehicle 100 in a driving operation is shown. In this example, the vehicle 100 is an automobile that is depicted as traveling along a surface 205, such as a road or highway, although the surface 205 may be any surface or material that is capable of supporting and providing passage to vehicles. Examples include roads, parking lots, highways, interstates, runways, off-road areas, waterways, or railways. In one embodiment, while the vehicle 100 is operating, the vehicle 100 detects events including operational hazards, operational notifications, points-of-interest, and other situations relevant to the passengers and operation of the vehicle 100.

Examples of the operational hazards include objects in the path of the vehicle 100 along the surface 105 or upcoming changes in the configuration of the surface 105. The operational hazards may be detected while the vehicle 100 is operating in an autonomous mode, semi-autonomous mode, or manual mode. The operational notifications include, for example, impending turns, vehicle speed, fuel level, required maintenance, etc. Examples of the points-of-interest include restrooms, eateries, hotels, tourist destinations and other useful or interesting locations. In general, the points-of-interest are, for example, selected by one or more of the passengers as relevant interests for a particular route/trip. Alternatively, in one embodiment, the points-of-interest are pre-programmed into the indication system 165 as points-of-interest that are relevant to a particular passenger of the vehicle 100.

In either case, the indication system 165 may inform a passenger about the operational hazards, the operational notifications, the points-of-interest or other situations through one or more different types of notices. In the example of FIG. 2, a passenger 210 is shown driving the vehicle 100. Accordingly, the passenger 210 may also be referred to as a driver (i.e., passenger 210) of the vehicle 100, although reference to a passenger or passengers will generally be understood to also include the driver for purposes of this description. A view presented in FIG. 2 is similar to that of the passenger 210 that is directed towards a front windshield 215 of the vehicle 100. As can be seen, the vehicle 100 may be equipped with one or more seats 220 that may be used to support the passenger 210 and other passengers (not illustrated).

In one embodiment, the vehicle 100 may include a primary instrument panel 225, which displays various user interface (UI) elements to the passenger 210. For example, the primary instrument panel 225 includes one or more displays 230 that are configured to display notices to the passenger 210. As another example of a device that may be used by the indication system 165 to display notices, the vehicle 100 includes a heads-up display (HUD) 235. In one embodiment, a HUD projects an image 240 onto, in front of, or in some other spatial relationship with the windshield 215 or some other surface to enable the passenger 210 to see the image 240 without looking away from the windshield 215. The primary instrument panel 225 may also include one or more speakers 245 for broadcasting audio to the passenger 210 including, for example, notices. The one or more speakers are examples of audio devices 175 of FIG. 1 that may be controlled by the indication system 165 to produce audible notices. In additional examples, the audio devices 175 include a radio/speaker system of the vehicle 100, speakers integrated with side, rear, and ceiling panels, speakers integrated within mobile devices, speakers integrated within entertainment devices, and so on.

The displays 230 that comprise the primary instrument panel 225 and the HUD 245 are examples of display devices 170 of FIG. 1 that are adaptively selected by the indication system 165 to communicate notices to the passenger 210. Further examples of the display devices 170 will be discussed subsequently, however, it should be appreciated that the display devices 170 may include monitors integrated within the primary instrument panel 225, within a dashboard, within various side, rear, and ceiling/roof panels, and within anterior portions of seats including the seats 220. Furthermore, the display devices 170, in one embodiment, also include mobile devices, such as, smartphones, tablets, laptops, and so on.

Additionally, the vehicle 100 also includes a passenger compartment 250 comprising the seats 220, the primary instrument panel 225, and various other structures and systems. In some embodiments, the passenger compartment 250 includes one or more side doors (not illustrated) and a section designed to carry rear-seat passengers (not illustrated). As will be discussed subsequently in relation to further embodiments, additional displays, lighting and speakers are positioned throughout the passenger compartment 250.

In FIG. 2, the passenger 210 is illustrated in an operating position that may also be referred to as a "conventional" operation position. In this position, the passenger 210 is seated substantially upright and with a viewing orientation that is substantially toward the primary instrument panel 225. The driver seat 220 may be slightly inclined, raised or lowered, or moved away from or closer to the primary instrument panel 225 and can still maintain the conventional operating position for the passenger 210 with the viewing orientation focused on the primary instrument panel 225. As used herein, viewing orientation generally refers to a physical position of the passenger 210 that influences a line-of-sight of the passenger 210. The line-of-sight of the passenger generally refers to a direction towards which eyes of the passenger 210 are naturally directed when in a particular viewing orientation.

As an example, the passenger 210 uses the conventional operating position for actively operating the vehicle 100 in a manual mode and when transitioning from an autonomous mode to a manual mode. In the conventional operating position, the passenger 210 receives indications through, for example, the displays 230 of the primary instrument panel, including the HUD 235, and the speaker 245 that are integrated into the primary instrument panel 225, as these UI elements are within the line-of-sight of the passenger 210 since the passenger 210 is seated upright and facing toward the primary instrument panel 225. In one embodiment, the instrument panel 225 and/or other locations within the vehicle 100 include an eye tracking device 180. In further embodiments, the eye tracking device 180 may be separate from the vehicle 100 and instead integrated with a mobile device. In either case, the eye tracking device 180 operates to, for example, determine the line-of-sight of the passenger by measuring motion of the eyes relative to the head (either continuously or intermittently). Additionally, the eye tracking device 180 may be a camera that optically tracks the eyes of the passenger 210 or another suitable device.

Figure 3:
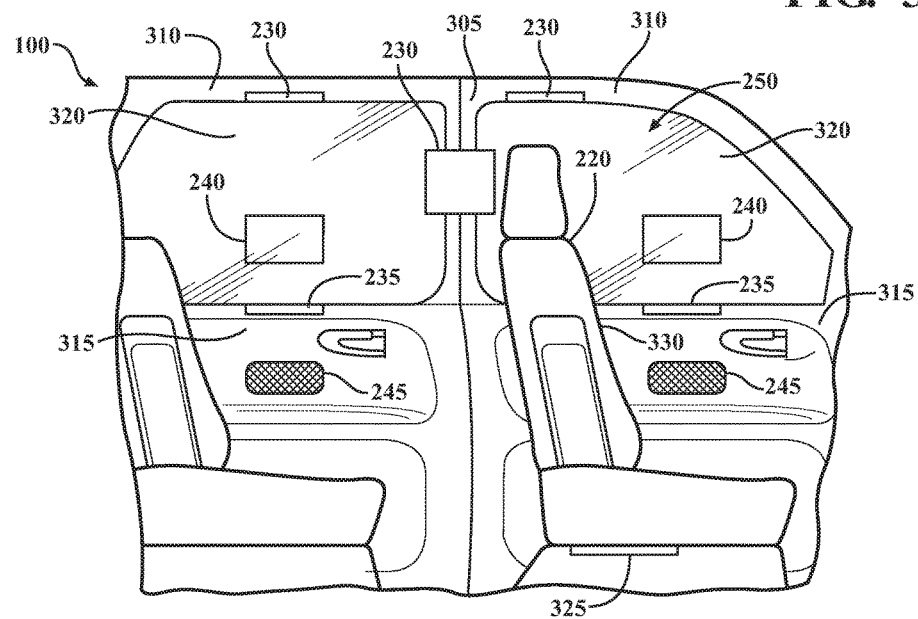
FIG. 3 illustrates one example of a cutaway side view of the vehicle of FIG. 1.

Referring to FIG. 3, another view of the vehicle 100 is illustrated, primarily directed to the side of the passenger compartment 250. As shown here, one or more additional displays 230 or HUDs 235 may be incorporated into different sections of the passenger compartment 250. For example, a display 230 may be integrated into support columns or pillars 305 or the roof 310 of the passenger compartment 250. As another example, HUDs 235 may be built into the side panels 315 of the passenger compartment 250 to cause the image 240 to be projected onto, in front of, or in some other spatial relationship with a side window 320 or some other surface to enable the passenger 210 to see the image 240 without having to look away from the side window 320. Similarly, the speakers 245 may be embedded into one or more of the side panels 315 of the passenger compartment 250. This optional positioning of such UI elements, as will be described more fully below, may be useful to provide indications to a passenger 210 that has positioned the driver seat 220 out of a conventional operation position while the vehicle 100 is in an autonomous mode.

In one arrangement, the driver seat 220 is equipped with a seat-position circuit 325, which can include any suitable number and type of circuitry and other components for moving the driver seat 220 to various positions. The seat position circuit 325 is one example of a seat position device 185 as illustrated in FIG. 1. As an example, the seat-position circuit 325 may be configured to move the seat in a translational manner, such as in a linear motion towards or away from the front of the passenger compartment 250. The seat-position circuit 325 may also be configured to raise or lower the driver seat 220 or to tilt a backrest section 230 of the driver seat 220. In FIG. 2, the driver seat 220 is shown in a substantially vertical tilt position, which may be slightly positioned away from true vertical to provide the passenger 210 some comfort while maintaining a conventional seating position. In another arrangement, the seat-position circuit 325 may be configured to rotate the driver seat 220 substantially around an axis (not shown), which may cause the front surface of the backrest section 230 to face away from the front of the passenger compartment 250.

The different movements of the driver seat 220 that the seat-position circuit 325 effectuates may be performed serially or simultaneously. For example, the seat-position circuit 325 may be configured to move the driver seat 220 translationally first, completing that movement, and then rotating the driver seat 220 to the final desired position. As an alternative example, the seat-position circuit 325 may be set to carry out the translational and rotational movements of the driver seat 220 at the same time. Moreover, the seat-position circuit 325 and the driver seat 220 are not limited to the movements described here, and the seat-position circuit 325 may move the driver seat 220 to any number of positions. A seat-position circuit 325 may also be integrated with other seats 220 of the passenger compartment 250 to control the positioning of those seats 220.

The passenger 210 (or another passenger) may access a set of controls (not shown) to operate the seat-position circuit 225, such as by activating one or more buttons or by speaking one or more commands. When a seat 220 is moved to a position, the seat-position circuit 325 may electronically signal another component, such as a processor 110, to inform the indication system 165 of the current positioning of the seat 220. Alternatively, the indication system 165 may directly receive the indications from the seat position circuit 325 and/or directly query the seat position circuit 325 about a present position of the seat 220. Furthermore, while the seat position circuit 325 is discussed in the sense of controlling a motor or some other device to move the seat 220 automatically, in one embodiment, the seat 220 is moved between positions manually and the seat position circuit 325 provides notice to the indication system 165 about a present position of the seat 220.

Figure 4:
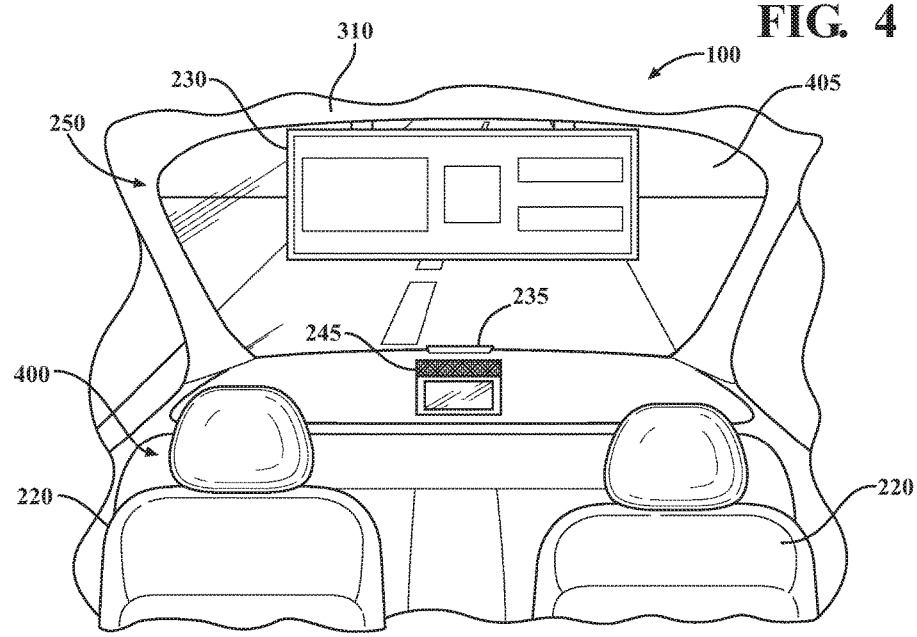
FIG. 4 illustrates another example of the forward section of the vehicle of FIG. 1.

Referring to FIG. 4, another view of the passenger compartment 250 of the vehicle 100 is shown. This view is a partial illustration of the rear of the passenger compartment 250 in which several rear seats 220 are positioned in a rear portion 400 of the compartment 250. In this example, a rear display 230 may be attached to and suspended from the roof 310 of the passenger compartment 250. As an example, the rear display 230 may be typically embedded within the roof 310 of the passenger compartment 250 but can be lowered from a storage position in the roof 310 when the vehicle 100 is operating in an autonomous mode. It should be noted, that while the rear display is referred to using the numeral 230, the rear display and other displays indicate with the numeral 230 are separate displays within the vehicle 100 that are categorized as with the display devices 170 of FIG. 1.

Continuing with FIG. 4, when the vehicle 100 transitions to a manual mode, the rear display 230 may be raised again and stowed in a storage location to avoid blocking the rear view of the passenger 210. As an option, any number of speakers 245 may also be positioned in the rear portion 400 of the passenger compartment 250. As another option, a HUD 235 may be integrated into the rear portion 400 of the compartment 250 for projecting an image 240 (not illustrated) onto a rear window 405 or some other suitable surface. In either case, if the vehicle 100 is placed in an autonomous mode and the driver seat 220 is reversed such that the front surface of the backrest section 330 (see FIG. 3) is facing towards the rear window 405, the rear display 230, the rear HUD 235, the rear speaker 245, or any combination thereof may provide indications to the passenger 210.

As an additional matter, while not explicitly illustrated the rear portion 400, the side panels 315, the roof 310 and other suitable locations with the passenger compartment 250, in one embodiment, include embedded lighting as the display devices 170. That is, the passenger compartment is equipped with LED, incandescent or other suitable lighting that is controllable by the indication system 165 to communicate notices to the passenger 210. In one embodiment, the embedded lighting of the passenger compartment 250 is divided into logical sections (i.e., left/right, forward/rear, roof/floor) so that different sections and combinations of sections can be independently illuminated to convey different notices. For example, a right side of the passenger compartment may be illuminated with a flashing light when turning right. As another example, the entire passenger compartment may be illuminated in red when the indication system 165 is providing a warning or handover back to manual mode. In general, the intensity, color, duration of illumination, particular illuminated sections, and other characteristics of the embedded lighting can be selectively varied according to particular attributes of a notice that is to be communicated. In this way, the indication system 165 can convey a myriad of different notices using the embedded lighting of the passenger compartment 250.

Figure 5:
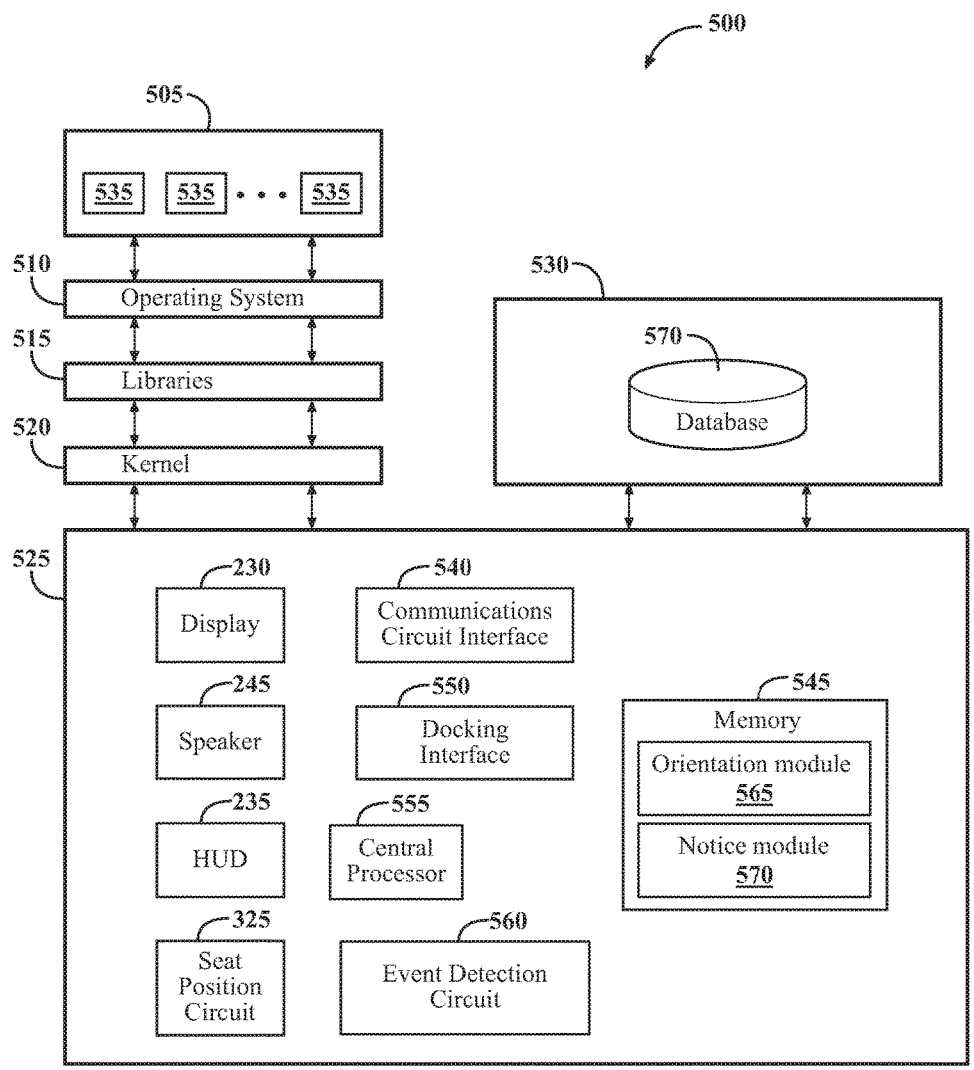
FIG. 5 illustrates one embodiment of an indication system associated with adaptively communicating notices to passengers of a vehicle.

Referring to FIG. 5, an example of a block diagram of an indication system 500 is illustrated. The indication system 500 is a more detailed view of the indication system 165 of FIG. 1. The indication system 500 (also referred to herein as system 500) may be representative of and may include at least some of the components described with reference to FIGS. 1, 2, 3, and 4 although the system 500 is not necessarily limited to those components. The description associated with FIG. 5 may expand on some of the components and processes presented in the discussion of FIGS. 1, 2, 3, and 4 although the additional explanations here are not meant to be further limiting.

In one embodiment, the indication system 500 includes an application layer 505, an operating system (OS) 510, one or more libraries 515, a kernel 520, a hardware layer 525, and a database layer 530. The application layer 505 may include any number of applications 535, which may serve as an interface to enable a passenger 210 (not shown here) to interact with the system 500 and to execute tasks or features provided by the system 500. In addition, the passenger 210 may provide electronic inputs that launch other processes associated with the vehicle 100 through the applications 535. For example, a passenger 210 may provide an electronic input to launch an application 535 that enables the vehicle 100 to operate in an autonomous mode, adjust a temperature setting of the vehicle 100, or access a digital map associated with a GPS-based system.

In one embodiment, the OS 510 is responsible for overall management and facilitation of data exchanges and inter-process communications of the indication system 500, as well as various other systems of the vehicle 100. The libraries 515, which may or may not be system libraries, may provide additional functionality related to the applications 535 and other components and processes of the system 500. The kernel 520 can serve as an abstraction layer for the hardware layer 525, although in some cases, a kernel may not be necessary for the system 500. Other abstraction layers may also be part of the system 500 to support and facilitate the interaction of the applications 535 with the lower levels of the system 500, although they may not necessarily be illustrated here.

The hardware layer 525 may include various circuit- or mechanical-based components to facilitate the processes that are described herein. For example, the hardware layer 525 may include connections (e.g., data bus, wireless, direct-wired connections) with the displays 230 (i.e., display devices 170), the HUDs 235, the speakers 245 (i.e., audio devices 175), one or more communications circuit interfaces 540, one or more memory units 545, one or more docking interfaces 550, one or more processors 555, one or more event-detection circuits 560, and one or more seat-position circuits 565 (i.e., Seat Position Device 185), which are representative of the seat-position circuit 325 shown in the other drawings. In addition, the database layer 530 may include a suitable number of databases 570 that store data, such as in a persistent (e.g., non-volatile) manner.

The indication system 500 may use the speakers 245 to broadcast relevant audio, including notices associated with the operation of the vehicle 100. This output may supplement the information shown by the displays 230 or HUDs 235, or it may be in lieu of the images being displayed. The speakers 245 may be integrated with the displays 230 or may be separate components. In addition to providing warnings, the speakers 245 may broadcast sounds related to other functions of the vehicle 100, such as audible directions from a guidance system (not shown) or music from a stereo system (not shown).

The hardware layer 525 may include any number of communications circuit interfaces 540, each of which may be configured for conducting communications in accordance with a specific frequency (or range of frequencies) and/or one or more particular communication protocols. For example, a communications circuit interface 440 may be configured to conduct long-range communications, such as satellite or cellular, or exchange short-range signals, such as those in accordance with the protocols for Bluetooth, Near Field Communication (NFC), or Wi-Fi. Other protocols and types of communications may be supported by the communications circuit interface 440, as the vehicle 100 is not limited to these particular examples described here.

The memory unit 545 can be any number of units and type of memory for storing data. As an example, the memory units 545 may store instructions and other programs to enable any of the components, devices, and systems of the indication system 500 to perform their functions. As an example, the memory units 545 can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory units 545 can be a component of the central processor 455, or the memory units 545 can be communicatively connected to the processor 555 (and any other suitable devices) for use thereby. These examples and principles presented here with respect to the memory units 545 may also apply to any of the databases 570 of the database layer 530.

The docking interface 550 may include circuitry for establishing communications with a portable computing device (not shown), such as a tablet or a smartphone. The communications can be based on wireless or wired connections and (for a wireless coupling) in accordance with any short-range protocol, like Bluetooth or Wi-Fi. In one arrangement, indications may be provided to the passenger 210 or another passenger through a portable computing device that is communicatively coupled with the docking interface 550. In another arrangement, the docking interface 550 may include structural elements for receiving and physically securing a portable computing device (not shown), such as a smartphone or tablet. In some cases, the portable computing device may simply be physically secured by the docking interface 550 without being communicatively coupled to it. If so, the portable computing device, while secured by the docking interface 550, could be communicatively coupled to some other device of the vehicle 100, such as the communications circuit interface 440.

The processor 555 can be configured to receive input from any number of systems of the vehicle 100, including those of the indication system 500, and can execute programs or other instructions to process the received data. In one embodiment, the processor 555 executes instructions of one or more modules stored in the memory 545. For example, in one embodiment, the memory 545 stores an orientation module 565 and a notice module 570. The orientation module 565 and the notice module 570 will be discussed in greater detail subsequently; however, it should be understood that the modules 565 and 570 are generally comprised of instructions that when executed by the processor 555 cause the processor 555 to perform various functions. The processor 555 may request additional data from other resources and can provide output to the indication system 500 or other systems of the vehicle 100.

For example, the processor 555 may receive input from the event detection circuit 460 of the vehicle 100 and determines that an event requires a notice to be provided to, for example, the passenger 210. This determination may be performed while the vehicle 100 is operating in either an autonomous mode, a semi-autonomous mode, or a manual mode. Examples of such events include hazards in the path of the vehicle 100, like a pedestrian, or operational parameters that should be addressed, such as a low fuel or battery level. In some cases, the detected event may cause the processor 555 to generate a signal that indicates a handover from the autonomous mode to a manual mode. As another example, one of the seat-position circuits 565 may signal the processor 555 to provide the processor 555 with a current position of the corresponding seat 220. The seat-position circuit 325 may update such information if the current position of the seat 220 changes. As will be explained more fully below, based on this information, the processor 555 may select a particular display 230, HUD 235, speaker 245, any combination of the three, or some other UI element to provide the passenger 210 or other passenger an indication of the detected event.

Any suitable architecture or design may be used for the processor 555. For example, the processor 555 may be implemented with one or more general-purpose and/or one or more special-purpose processors, either of which may include single-core or multi-core architectures. Examples of suitable processors include microprocessors, microcontrollers, digital signal processors (DSP), and other circuitry that can execute software. Further examples of suitable processors include, but are not limited to, a central processing unit (CPU), an array processor, a vector processor, a field-programmable gate array (FPGA), a programmable logic array (PLA), an application specific integrated circuit (ASIC), and programmable logic circuitry. The processor 555 can include at least one hardware circuit (e.g., an integrated circuit) configured to carry out instructions contained in program code.

In arrangements in which there is a plurality of central processors 555, such processors can work independently from each other or one or more processors can work in combination with each other. In one or more arrangements, the processor 555 can be a main processor of the indication system 500 or the vehicle 100. This description about processors may apply to any other processor that may be part of any system or component described herein.

Figure 6:
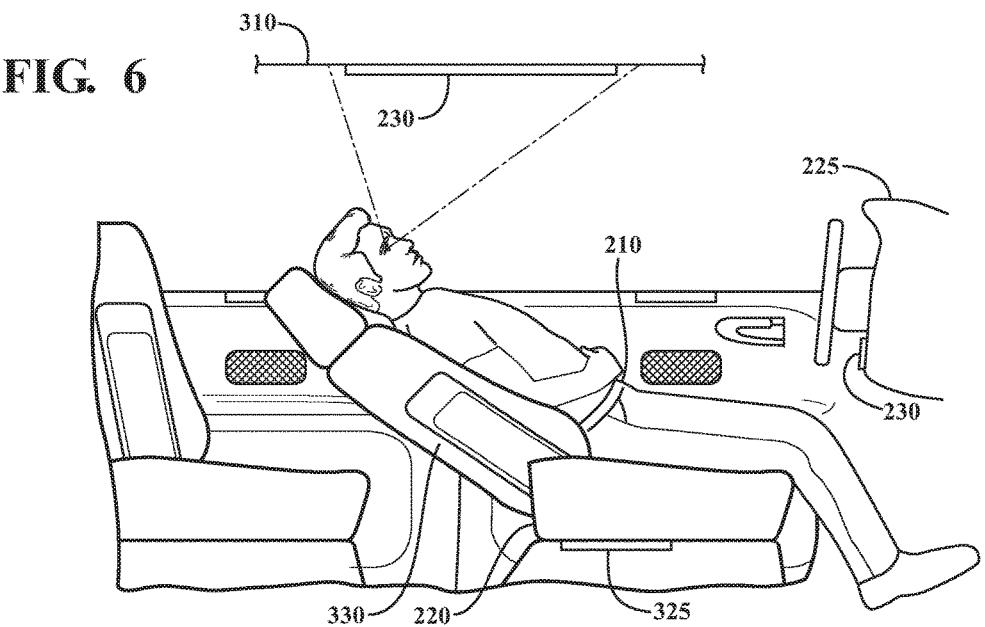
FIG. 6 illustrates an example of a vehicle with a seat that is in a substantially horizontal reclining position.

Referring to FIG. 6, an example of the driver seat 220 in a recline or side position is illustrated. Here, the passenger 210 may have activated the seat-position circuit to cause the backrest section 330 to move to a substantially horizontal position. In this case, the seat-position circuit 325 may move the backrest section 230 in at least a tilt motion to achieve this particular orientation. The substantially horizontal position is referred to as a recline position. In one embodiment, the recline position may be a position that the seat 220 can achieve out a range of possible positions. In particular, the seat-position circuit 325 may move the backrest section 230 to a more or less severe angle in comparison to what is illustrated in FIG. 5. As such, the passenger 210 may adjust the seat 220 to any number of positions.

The recline position of FIG. 5 may be referred to as an unconventional operating position. An "unconventional operating position" is defined as a position or orientation of a seat during the operation of a vehicle that substantially obstructs a line-of-sight of the passenger 210 from being directed at the primary instrument panel 225 or that substantially causes the seat to face away from the instrument panel 225. For example, a seat 220 in an unconventional operating position may result in a viewing orientation of the passenger 210 where the primary instrument panel 225 is not within the line-of-sight (also referred to as the field of vision) of the passenger 210. In FIG. 6 the line-of-sight is represented by the dashed lines emitting from the eyes of the passenger 210. As another example, a seat 220 may be considered in an unconventional position based on one or more predetermined angles, such as whether the backrest section 230 is equal to or more than forty-five degrees from true vertical or whether the orientation of the seat 220 has been rotated at least or more than ninety degrees with respect to the front primary instrument panel 225. Thus, in one embodiment, the indication system 500 identifies the position of the seat and determines the line-of-sight therefrom.

In comparison, a "conventional operating position" is defined as a positioning or orientation of a seat during the operation of a vehicle that the seat is a part of and that substantially allows the seat passenger (or driver) to see the front instrument panel of the vehicle or one or more displays of the front instrument panel or that substantially causes the seat to face towards the instrument panel. An example of a conventional operating position for a seat 220 is illustrated in FIG. 2. Like the unconventional operating position examples recited above, a conventional operating position may be based on predetermined angles (e.g., backrest section 230 less than forty-five degrees from true vertical or seat 220 rotated less than ninety degrees with respect to front primary instrument panel 225) or on placing certain components of the primary instrument panel 225 within the field of vision of the passenger 210 (e.g., the display 230 of the primary instrument panel 225).

In one arrangement, the seat 220 may be moved to unconventional operating positions when the vehicle 100 is in an autonomous mode and not when in a manual or semi-autonomous mode. Moreover, if the vehicle 100 is in an autonomous mode and a transition to the manual or the semi-autonomous mode is requested, the seat-position circuit 325 may be configured to automatically adjust the seat 220 to a conventional operating position.

As noted earlier, any number of displays 230 may be incorporated in the passenger compartment 250. In one case, a display 230 may be placed in a certain location based on the capability of the seat 220 being moved to a position that corresponds to that location. For example, referring once again to FIG. 6, based on the seat 220 having a capability of moving to a recline position, the roof display 230 can be integrated with the roof 310. Accordingly, when the passenger 210 is in this viewing orientation, the passenger 210 can have an unimpeded and favorable view of the roof display 230.

In another example, if the seat 220 is in the orientation shown in FIG. 6, the passenger 210 may be lying on his or her side. In this example, the seat 220 may be considered in a side position. Referring to FIGS. 3 and 6, in this case, the passenger 210 may be facing a side panel 215, either on the driver or passenger side of the passenger compartment 250. As such, the location of one or more of the side displays 230 or HUDs 235 may be set to correspond to this possible orientation of the passenger 210. In either this example or the one involving the roof display 230, to have a location correspond to a particular positioning that the seat 220 is capable of achieving means to situate the display 230 or other UI element to match approximately one or more predicted viewing angles for that positioning of the seat 220. In another example, the displays 230 or HUDs 235 may include or be attached to structural components that allow them to be moved by the passenger 210 to improve a viewing experience. Each of these principles may apply to other UI elements, including the speakers 145, which can supplement the visual indication provided by the selected display 230. As another example, if there is a possibility that a passenger 210 may be in two or more orientations for a given position of the seat 220, such as the recline or side position, the processor 555 may signal any number of displays 230 that correspond to the different possible positions. For example, both the roof display 230 and the side displays 230 may be selected to show the indications.

Thus, the seat position may be used to infer a viewing orientation of the passenger 210. However, when further precision is desired, the eye tracking device 180 may be used to obtain additional information about where the eyes of the passenger are directed. Additionally, for positions of the seat 220 corresponding to two or more viewing orientations, the orientation module 565 may use additional inputs from the eye tracking device 180 to refine the viewing orientation further.

Moreover, as previously referenced, the embedded lighting of the passenger compartment 225 may be selectively illuminated according to a viewing orientation of the passenger 210. Thus, when the passenger 210 is in a reclined position as indicated by the seat position circuit 565, embedded lighting of the roof panel 310 may be illuminated. Similarly, when the passenger is viewing the side panel 315, then the indication system 500 may illuminate embedded lighting of the doors, side panels, and/or floor. Additionally, in one embodiment, when the indication system 500 determines that the passenger 210 is viewing a mobile device (e.g., smartphone) or when a viewing orientation of the passenger 210 cannot be determined (e.g., eyes closed or passenger/driver not in seat), then the embedded lighting of the whole passenger compartment may be controlled to provide the notice.

Figure 7:
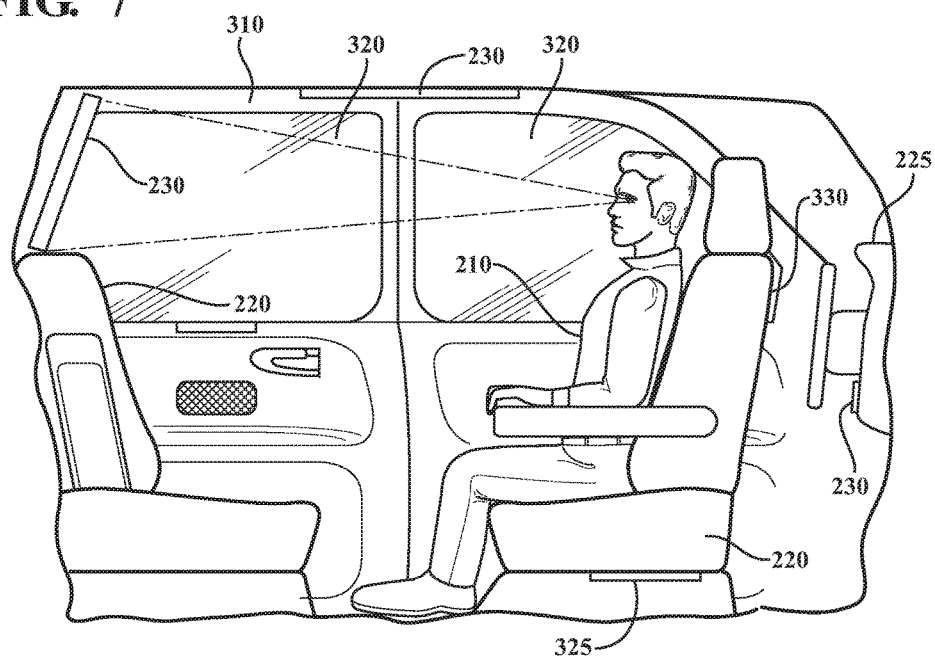
FIG. 7 illustrates an example of a seat in a reverse position.

Referring to FIG. 7, an example of the seat 220 placed in a reverse position is illustrated. Like the recline or side positions, the reverse position may be considered to be an unconventional operating position. In this example, the vehicle 100 may be in an autonomous mode, and the seat-position circuit 325 may cause the seat 220 to rotate about an axis to achieve the reverse position. As an option, the passenger 210 may also adjust the seat 220 to the recline position, such as through a tilt motion via the seat-position circuit 205. These different movements may be carried out simultaneously or successively.

In the reverse position, the seat 220 (and the backrest section 230) may face away from the front primary instrument panel 225, including the display 230 of that panel 125. Similar to the recline and side positions, a display 230, such as the rear display 230, can be positioned to correspond to the reverse position. If the passenger 210 takes an orientation like that pictured in FIG. 6, then the rear display 230 may provide a convenient viewing experience for the passenger 210. In addition, if the seat 220 is moved to both a reverse position and a recline or side position, the passenger 210 may focus on the roof display 230, the side displays 230, or images 140 (see FIG. 2) projected on or near the side windows 220 from a HUD 235 (see FIG. 2). The displays 230 that correspond with the unconventional operating positions of the seat 220 may be part of a set of displays 230 that are exclusive from the front primary instrument panel 225. This set may also include one or more HUDs 235, speakers 145, or other UI elements that are not part of or integrated with the front primary instrument panel 225.

As previously noted, indications may also be provided to a portable computing device (not shown), such as one that is physically coupled to the docking interface 550 (see FIG. 5) or in use wirelessly within the vehicle 100. These docking interfaces 550, like the displays 230, may be strategically positioned in the passenger compartment 250 to place the portable computing device in a location that corresponds to any one of the possible positions of the seat 220.

As another option, the vehicle 100 may be equipped with various sensors to help determine the orientation of the passenger 210 (or another passenger). For example, one or more eye tracking devices 180 can be built into the passenger compartment 250 for determining the positioning of the head or eyes of the passenger 210. As another example, one or more pressure sensors can be implemented into a seat 220 (e.g., pressure/weight sensor) to determine the orientation of the passenger 210 and/or whether the passenger is sitting in the seat or has moved to another location in the passenger compartment 250. This information associated with the orientation of the passenger 210 may be useful for certain situations, such as determining whether the seat 220 is considered in a recline or side position. Numerous other techniques may be relied on to help determine the positioning of the passenger 210, no matter the orientation of the seat 220.

Figure 8:
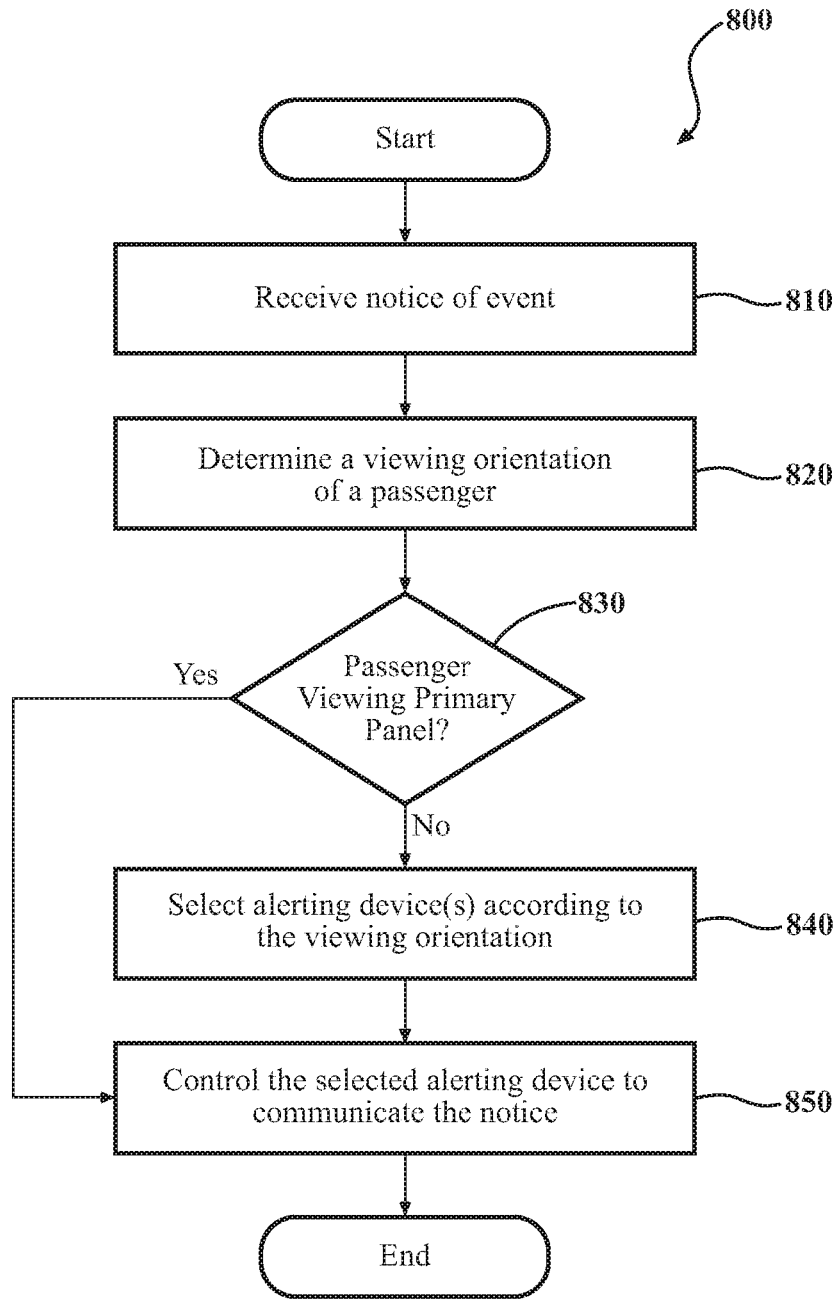
FIG. 8 illustrates one embodiment of a method associated with adaptively communicating notices to a passenger in a vehicle.

With reference to FIG. 8, one embodiment of a method 800 associated with adaptively providing notices within a vehicle is illustrated. For purposes of brevity in this discussion, method 800 will be discussed from the perspective of the indication system 500 of FIG. 5. Of course, while method 800 is discussed in combination with the indication system 500, it should be appreciated that the method 800 is not limited to being implemented within the indication system 500, but is instead one example of a system that may implement the method 800.

At 810, the orientation module 565 receives a notice about an occurrence of an event. In one embodiment, the event detection circuit 560 receives the notice in the form of an electronic signal from the processor 110, the sensor system 120, the vehicle system 140, and/or the autonomous driving module 160. Furthermore, the event detection circuit 560, in one embodiment, relays the notice to the orientation module 565 so that the orientation module 565 can analyze information about the occurrence to select an available device from the display devices 170 and/or the audio devices 175 through which to communicate the notice. In either case, the event detection circuit 560 and/or the orientation module 565, either in concert or individually, monitor for the notice in order to initiate the method 800 upon the occurrence of the event. Furthermore, receiving the notice is generally understood to include receiving the notice while the vehicle 100 is operating in the autonomous mode, as previously discussed. However, the indication system 500 and the method 800 may also operate to provide notices when the vehicle 100 is operating in the semi-autonomous mode or the manual mode. In one embodiment, the action of switching between operating in the semi-autonomous mode or the manual mode to operating in the autonomous mode initiates the method 800, at 810 to monitor for the notice.

The notice is, for example, a communication about the occurrence of the event that is to be provided to the passenger 210 to alert the passenger 210 about the occurrence. As previously discussed, the event is an incident associated with the vehicle 100 for which the passenger 210 is to be informed. Accordingly, the event may be an occurrence of the operational hazards, the operational notifications, passing within a proximity of the points-of-interest, and other situations relevant to the passengers and operation of the vehicle 100.

At 820, the orientation module 565 determines a viewing orientation of the passenger 210. As previously explained, the viewing orientation of the passenger 210 refers to a physical position of the passenger 210 within the vehicle 100 from which an interior area of the passenger compartment 250 that is likely being viewed by the passenger 210 can be inferred. Thus, the viewing orientation of the passenger 210, in one embodiment, indicates a line-of-sight/field-of-vision of the passenger 210 in relation to interior sections of the passenger compartment 250. In further embodiments, the viewing orientation also indicates a general attentiveness of the passenger 210. In other words, the viewing orientation may indicate whether eyes of the passenger 210 are open or closed, whether the passenger 210 is actively engaged in using a mobile device, whether the passenger 210 (e.g., driver) is sitting in the seat 220, and so on. It is generally envisioned, that various sensors can be integrated with the vehicle 100 to determine the viewing orientation of the passenger 210 to a desired degree. For example, in one embodiment, a complement of eye tracking devices 180 are integrated into various locations of the passenger compartment 250 along with the seat position devices 185, seat pressure sensors, and heartbeat monitors, to provide a precise determination of the viewing orientation of the passenger 210 to within, for example, a close degree of precision of where the passenger 210 is actually viewing.

By contrast, in another embodiment, the vehicle 100 is equipped with just the seat position device 185 as a means to determine the viewing orientation. A choice of the degree of precision to which the viewing orientation can be determined is, for example, implementation-specific and thus may vary according to different implementations of the indication system 500. However, regardless of the particular sensors used, the viewing orientation is determined at 820 according to the electronic inputs.

In one embodiment, the indication system 500 uses electronic inputs from the sensors, from state tables (e.g., listing of active mobile devices in the vehicle 100), and other sources as a basis to determine the viewing orientation. For example, the indication system 500 determines the viewing orientation through analyzing the electronic inputs to determine attributes of the passenger 210 that provide insights about the viewing orientation.

The following examples illustrate how electronic inputs from the seat position device 185, the eye tracking device 180, and other devices are used to determine the viewing orientation and line-of-sight of the passenger 210. The following examples are provided as a sample of possible correlations and are not intended to be a comprehensive listing.

For example, when the seat position device 185 indicates that the seat 220 is presently in a side position, then the orientation module 565 identifies the line-of-sight of the passenger 210 is viewing a side panel 315 of the vehicle 100.

In another example, when the seat position device 185 indicates that the seat 220 is presently in a reverse position (see FIG. 7), then the orientation module 565 identifies the line-of-sight of the passenger 210 is viewing a rear portion 400 of the vehicle 100.

In another example, when the seat position device 185 indicates that the seat 220 is presently in a recline position (see FIG. 7), then the orientation module 565 identifies the line-of-sight of the passenger 210 is viewing a roof panel 310 of the vehicle 100.

In another example, when a seat pressure sensor (not illustrated) indicates that the passenger 210 (i.e., the driver) is not in the seat 220, then the orientation module 565 may classify the viewing orientation as indeterminate. In still other examples, input such as activation of a secondary display, activation of particular content within one of the displays (e.g., entertainment content, video games, and so on) may also be used as inferences that the passenger 210 is inattentive or otherwise not viewing the primary instrument panel 225.

While the foregoing examples generally focus on a position of the seat 220 as a primary indicator of where in the passenger compartment 250 the passenger 210 is presently viewing, in further embodiments, additional sensors, such as the eye tracking device 180 may be used as the sole electronic input to determine the viewing orientation or may be used in combination with input from the seat position device 185 to, for example, refine the determination of the viewing orientation.

Moreover, in one embodiment, the orientation module 565 determines whether the passenger is engaged with (i.e., presently using/viewing) a mobile device to determine the viewing orientation or, in the context of use of a mobile device, whether the passenger 210 is generally inattentive to the primary instrument panel 225 and other ones of the displays 230 in the vehicle. In one embodiment, the orientation module 565 queries a connection/state table that is, for example, maintained by a wireless access point, the docking interface 550, or another component of the vehicle 100. In general, the connection/state table is a listing of active devices within the vehicle 100 that may be using an access point of the vehicle to connect wirelessly to the Internet or to interact with systems of the vehicle 100 itself. In either case, the connection/state table identifies whether any mobile devices are presently in use.

Alternatively, in one embodiment, the orientation module 565 directly queries the mobile devices that are registered or otherwise listed in the state table to determine whether one or more are presently active. In still further embodiments, the orientation module 565 uses information signal strength indicators (SSI) of various mobile devices and/or access points in the vehicle to triangulate or otherwise generally locate the mobile devices within the vehicle 100. This information, either in isolation or, in combination with other sensor information from the vehicle 100 about the passenger 210 is used to provide a determination of the viewing orientation of the passenger 210.

At 830, the orientation module 565 determines whether the passenger 210 is viewing the primary instrument panel 225 of the vehicle 100. In one embodiment, the orientation module 565 uses the determination from 820 to decide whether a different communication device (i.e., the display devices 170 and/or the audio devices 175) than the primary instrument panel 225 is better suited to notify the passenger 225 because of the viewing orientation of the passenger 210. Consequently, if the viewing orientation of the passenger 210 indicates that the passenger is viewing the primary instrument panel 225, then, in one embodiment, the indication system 500 proceeds to 850 where the notice module 570 communicates the notice using the primary instrument panel 225.

However, if the viewing orientation indicates that the passenger 210 is not viewing the primary instrument panel 225 because the passenger 210 is, for example, generally inattentive (e.g., eyes closed, not in the seat 220, etc.), in a reclined, side, or reverse position as indicated by the seat position device 185 or otherwise not viewing the primary instrument panel 225 as determined at 820, then the indication system 500 proceeds to 840.

At 840, the orientation module 565 selects at least one alerting device to use to communicate the notice. In one embodiment, the orientation module 565 selects one or more devices to use as the alerting device from available communications devices in the vehicle 100. The available communications devices are, for example, the display devices 170, the audio devices 175, and/or mobile devices connected to the vehicle 100 either through a hardware or wireless connection. Thus, in one embodiment, the alerting device is an installed or integrated device of the vehicle 100.

The orientation module 565 selects from the available devices according to the viewing orientation as determined at 820. In one embodiment, the orientation module 565 determines which of the available communication devices correspond with the viewing orientation of the passenger 210 using, for example, a pre-programmed mapping that identifies which of the available communications devices correspond with different viewing orientations within the passenger compartment 250. Accordingly, in one embodiment, the orientation module 565 uses the viewing orientation as an input value to a lookup table that embodies the pre-programmed mappings. The result of the orientation module 565 performing the lookup is a determination of one or more devices that can be used to provide the notice. In one embodiment, the determination at 840 ranks the devices according to which are best suited to communicate the notice. Thus, the orientation module 565 may be configured to select the top x number of devices as specified according to the ranking and, for example, preference settings previously configured within the vehicle 100.

Additionally, the orientation module 565, in one embodiment, may select a particular one of the devices (e.g., embedded compartment lighting, and/or speaker) by default when, for example, a determination of the viewing orientation is non-determinative (i.e., unable to identify a focus of the passenger 210) and/or the viewing orientation indicates that the passenger 210 is generally inattentive and not focused in a particular direction. In this way, the orientation module 565 selects at least one alerting device in place of the primary instrument panel 225 when the orientation of the passenger indicates that the line-of-sight of the passenger is oriented to the particular device or at no particular device. Moreover, in one embodiment, the orientation module 565 may select a particular one of the devices that is presently displaying entertainment content (e.g., movies, TV shows, video games, etc.) since a passenger may be more likely to be viewing such content in comparison to a navigation map or radio display.

The following examples provide insights into how determinations of viewing orientations relate to the selection of alerting devices by the orientation module 565. The following examples are provided as a sample of possible correlations and are not intended to be a comprehensive listing.

For example, when the viewing orientation indicates that a line-of-sight of the passenger 210 is directed to view the side panel 315, then the orientation module 565 selects a side display device that is located on the side panel.

In another example, when the viewing orientation indicates that a line-of-sight of the passenger 210 is directed to view the rear portion 400 of the vehicle 100, then the orientation module 565 selects a rear display device 230 that is located in the rear portion 400.

In another example, when the viewing orientation indicates that a line-of-sight of the passenger 210 is directed to view the roof panel 310 of the vehicle 100, then the orientation module 565 selects a roof display device 230 that is integrated with the roof panel 310 (See FIG. 6). In still another example, when the viewing orientation indicates that the passenger 210 is inattentive because the passenger 210 is not presently in the seat 220 or is asleep, then the orientation module 565 selects an alerting device in order to direct the notice to other passengers of the vehicle 100. That is, the orientation module 565 selects, for example, the embedded lighting or a display corresponding with a seat that is occupied by a passenger. In this way, the notice is directed to at least one passenger instead of being indicated on the primary instrument panel 225.

As a further example, when the orientation module 565 determines that the passenger 210 is using a mobile device and is thus considered to be inattentive and not focused on the integrated display devices 230 of the vehicle 100, then the orientation module 565 may select one or more of the speakers 245 and/or one or more sections of the embedded lighting of the passenger compartment 250. In this way, the orientation module 565 selects alerting devices that direct the notice throughout the passenger compartment 250 to ensure that irrespective of the viewing orientation of the passenger 210, the notice is stilled effectively communicated.

In a further embodiment, when the orientation module 565 determines that the passenger 210 is using a mobile device, the orientation module 565 transmits a query to the mobile device to discover whether the passenger 210 is actively using the mobile device. In one implementation, the orientation module 565 transmits the query to control an eye tracking device, activity monitor or another component of the mobile device to determine if the passenger 210 is using the mobile device. As a result, the orientation 565 receives a response from the mobile device about current activity of the passenger 210 including, for example, a viewing orientation when the mobile device tracks eyes of the passenger 210. Consequently, the orientation module 565 may select the mobile device to provide the notice, one of the displays 230, the embedded lighting, and/or the speakers 245 depending on how the mobile device responds.

At 850, the notice module 570 controls the at least one alerting device selected at 840 to communicate the notice to the passenger 210. The various devices that may be selected to communicate the notice, or at least the separate classes of devices, each generally provide the notice in a separate way. For example, the display devices 230 present graphics including text, the speakers 245 provide audible sounds that are either voice or other noises, the embedded lighting generates different notices according to different color and intensity patterns of light, the mobile devices may be controlled to provide pop-up notices, and so on.

As previously noted, the exact manner of how the notice module 570 controls the respective devices to produce the notice is generally implementation specific and depends on, for example, many different preferences of the passenger 210 and/or those that implement the indication system 500. In either case, the devices that present the notices are adaptively selected and controlled by the indication system 500 depending on the viewing orientation and other discussed factors. Because the notices are not limited to being provided through a single static location within the vehicle 100 by only a visual means, a likelihood that the passenger 210 receives the notice is improved.

Lastly, as an additional aspect, the notice module 570 may control the seat 220 of the passenger 210 to move into a position in which the passenger 210 is viewing the primary instrument panel 225 in addition to controlling the at least one alerting device. For example, when the notice relates to an event where control of the vehicle 100 is transitioning from the autonomous mode to the manual mode, the notice module 570 also controls the seat 220 to return to a position in which the passenger 210 can operate the vehicle 100.

Several examples will now be presented to show the further operation of the indication system 500. In one example, the vehicle 100 may be operating in the autonomous mode, and the passenger 210 may have used the seat-position circuit 325 to move the seat to a recline position, like that shown in FIG. 6. Eventually, the event detection circuit 560 may signal the processor 555 indicating that an event has been detected, such as a large obstacle blocking the intended path of the vehicle 100. In response, the processor 555 may determine that the passenger 210 should be notified of the detected event, particularly if the event requires a transition to manual mode or some other action on the part of the passenger 210.

The orientation module 565 may determine the current position of the seat 220, based on feedback received from the seat-position circuit 225. In view of this information, the orientation module 565 determines the viewing orientation, selects relevant one of the displays 230 and then the notice module 570 controls the relevant display to display the notice about the detected event. The display 230 that is selected may be a display 230 that corresponds to the current position, such as the roof display 230 if the recline position is the current position of the seat 220. Alternatively, a side display 230 or both a side display and the roof display 230 may be selected to show the notice if the current position of the seat 220 is the side position. Similarly, if the current position of the seat 220 is the reverse position, the orientation module 565 may signal the reverse display 230 to show the indication. In any of these scenarios, the processor 555 may signal other UI elements, such as a HUD 235, speaker 245, or a docked portable computing device, to show or broadcast the indication based on the detected current positioning of the seat 220. Further, the orientation module 565 may rely on information collected by one or more sensors to determine or confirm the orientation of the passenger 210 (or another passenger). The orientation module 565 may use this data to determine whether to, for example, signal the roof display 230 or the side display 230 when the seat 220 is in the recline (or side) position.

The notice that is provided to the passenger 210 may be in any suitable form, such as the display of any combination of symbols or text that reflects the detected event. Additionally, any form of audio that is related to the detected event may be broadcast from a speaker 245 at a particular volume, e.g., increased volume for warning notices or normal listening volume for standard notices. Other actions can be taken, such as the temporary application of the brakes of the vehicle 100 or a vibration applied to the seat 220, to alert the passenger 210. Other information, such as parameters or other data associated with the operation of the vehicle 100, may be provided to the passenger 210 through a UI element that has been selected based on the current position of the seat 220. A notice or information provided to the passenger 210 may also include one or more actions that the passenger 210 should or is required to take.

If the detected event prompts a transition from the autonomous mode to the manual mode, the notice module 570 may signal the seat-position circuit 325 to return the seat 220 to a conventional operating position automatically that causes the seat 220 to face the front primary instrument panel 225, if such a repositioning is necessary. If another event is detected later while the seat 220 is in the conventional operating position, the notice module 570 may signal the display 230 of the front primary instrument panel 225 to show the indication.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

The vehicle 100 has an associated longitudinal axis 103, which can be the central axis of the vehicle 100. The vehicle 100 has an associated longitudinal direction 104. "Longitudinal direction" means any direction that is substantially parallel to and/or co-linear with the longitudinal axis 103. The vehicle 100 has an associated lateral axis 105, which can be substantially perpendicular to the longitudinal axis 103. As used herein, the term "substantially" includes exactly the term it modifies and slight variations therefrom. Thus, the term "substantially perpendicular" means exactly perpendicular and slight variations therefrom. In this particular example, slight variations therefrom can include within normal manufacturing tolerances, within about 10 degrees or less, within about 5 degrees or less, within about 4 degrees or less, within about 3 degrees or less, within about 2 degrees or less, or within about 1 degree or less. The vehicle 100 can have an associated lateral direction 106. "Lateral direction" means any direction that is substantially parallel to and/or co-linear with the lateral axis 105.

The vehicle 100 can include one or more processors 110 that may be similar to the processor 555 of FIG. 5. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360 degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface. The terrain map(s) 117 can be high quality and/or highly detailed.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated continuously, periodically, irregularly, or even randomly to reflect additions, removals, and/or changes within a mapped area.

The one or more data stores 115 can include sensor data 119. In this context, "sensor data" means any information about the sensors that the vehicle 100 is equipped with, including the capabilities, parameters, characteristics, ranges, and other information about such sensors. As will be explained below, the vehicle 100 can include a sensor system 120. The sensor data 119 can relate to one or more sensors of the sensor system 120. As an example, in one or more arrangements, the sensor data 119 can include information on one or more LIDAR sensors 124 of the sensor system 120. Such information can include, for example, the number of outbound sensor signals emitted by the LIDAR or other sensor(s), the maximum working range of one or more of such outbound sensor signals, the arrangement of the outbound sensor signals, the orientation of the outbound sensor signals, and/or the frequency at which the outbound sensor signals are emitted. Such data can be obtained from any suitable source, including a sensor manufacturer, the vehicle manufacturer, and/or based on test data, just to name a few possibilities.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100. The map data 116 and/or the sensor data 119 can be obtained by the vehicle 100 from any suitable source, including a sensor manufacturer, the vehicle manufacturer, and/or based on test data, just to name a few possibilities.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described.

The sensor system 120 can include one or more vehicle sensors 121. The vehicle sensor(s) 121 can be configured to detect, determine, assess, monitor, measure, quantify and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, determine, assess, monitor, measure, quantify, and/or sense one or more characteristics of the vehicle 100. In one or more arrangements, the vehicle sensor(s) 121 can include a speedometer (not shown). The speedometer can determine a current speed of the vehicle 100, or data acquired by the speedometer can be used to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc. In one or more arrangements, the one or more environment sensors 122 can include a global navigation satellite system (GNSS), a global positioning system (GPS), a navigation system (which can be the navigation system 147 described below), and/or other suitable sensors.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123. "Radar sensor" means any device, component and/or system that can detect, quantify and/or sense something using at least in part radio signals. The one or more radar sensors 123 can be configured to detect, determine, assess, monitor, measure, quantify and/or sense, directly or indirectly, the presence of one or more obstacles in the external environment of the vehicle 100, the position of each detected obstacle relative to the vehicle 100, the distance between each detected obstacle and the vehicle 100 in one or more directions (e.g. in the longitudinal direction 104, the lateral direction 106 and/or other direction(s)), the elevation of each detected obstacle, the speed of each detected obstacle and/or the movement of each detected obstacle. The one or more radar sensors 123, or data obtained thereby, can determine the speed of obstacles in the external environment of the vehicle 100. Three-dimensional coordinate information can be associated with the data acquired by the one or more radar sensors 123.

In one or more arrangements, the sensor system 120 can include one or more LIDAR sensors 124. "LIDAR sensor" means any device, component and/or system that can detect, determine, assess, monitor, measure, quantify and/or sense obstacles using at least in part lasers. The LIDAR sensor can include a laser source and/or laser scanner configured to emit a laser signal and a detector configured to detect reflections of the laser signal. The one or more LIDAR sensors 124 can be configured to detect, determine, assess, monitor, measure, quantify and/or sense, directly or indirectly, the presence of one or more obstacles in the external environment of the vehicle 100, the position of each detected obstacle relative to the vehicle 100, the distance between each detected obstacle and the vehicle 100 in one or more directions (e.g. in the longitudinal direction 104, the lateral direction 106 and/or other direction(s)), the elevation of each detected obstacle, the speed of each detected obstacle, and/or the movement of each detected obstacle.

In one or more arrangements, the sensor system 120 can include one or more sonar sensors 125. "Sonar sensor" means any device, component and/or system that can detect, determine, quantify and/or sense something using at least in part sound waves. The one or more sonar sensors 125 can be configured to detect, determine, assess, monitor, measure, quantify and/or sense, directly or indirectly, the presence of one or more obstacles in the external environment of the vehicle 100, the position of each detected obstacle relative to the vehicle 100, the distance between each detected obstacle and the vehicle 100 in one or more directions (e.g. in the longitudinal direction 104, the lateral direction 106 and/or other direction(s)), the elevation of each detected obstacle, the speed of each detected obstacle, and/or the movement of each detected obstacle.

The sensor system 120 can include can include one or more cameras 126. "Camera" includes any device(s), component(s), and/or system(s) that is configured to capture visual data. "Visual data" includes video and/or image information/data. The visual data can be in any suitable form. In one or more arrangements, one or more of the cameras 126 can be oriented, positioned, configured, operable, and/or arranged to capture visual data from at least a portion of the external environment of the vehicle 100. Visual data acquired by the one or more cameras 126 can be used to detect, determine, assess, monitor, measure, quantify and/or sense, directly or indirectly, the presence of one or more obstacles in the external environment of the vehicle 100, the position of each detected obstacle relative to the vehicle 100, the distance between each detected obstacle and the vehicle 100 in one or more directions, the elevation of each detected obstacle, the speed of each detected obstacle, and/or the movement of each detected obstacle.

The one or more cameras 126 can be high-resolution cameras. The high resolution can refer to the pixel resolution, the spatial resolution, spectral resolution, temporal resolution and/or radiometric resolution. In one or more arrangements, the one or more cameras 126 can be high dynamic range (HDR) cameras or infrared (IR) cameras. The one or more cameras 126 can capture visual data in any suitable wavelength on the electromagnetic spectrum.

The sensor system 120, the processor(s) 110, and/or one or more other elements of the vehicle 100 can be operable to control movements of one or more of the sensors of the sensor system 120. It should be noted that any of the sensors described herein can be provided in any suitable location with respect to the vehicle 100. For instance, one or more sensors can be located within the vehicle 100, one or more sensors can be located on the exterior of the vehicle 100, and/or one or more sensors can be located so as to be exposed to the exterior of the vehicle 100.

The sensor system 120 can include one or more ranging sensors. "Ranging sensors" include sensors that can detect, quantify and/or sense obstacles from a distance and do not require physical contact with the obstacle. The various environment sensors 122 described above are examples of ranging sensors. Alternatively, or in addition to one or more of the above examples, one or more sensors can be configured to detect, quantify and/or sense the location of the vehicle 100 and/or the location of obstacles in the environment relative to the vehicle 100. Any suitable sensor can be used for such purposes. Such sensors may work independently and/or in combination with a positioning system of the vehicle 100.

It should be noted that the environment sensors 122 can send outbound sensor signals into the external environment of the vehicle 100 and can receive return sensor signals, which may reflect off of obstacles located in the external environment. Differences between the outbound sensor signals and their corresponding return sensor signals, as well as other information, can be used for detection purposes in any suitable manner, now known or later developed. A general description of the operation of a LIDAR sensor 124 is shown in FIG. 2. However, it will be understood that the description is applicable to other environment sensors 122.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 135. An "output system" includes any device, component, system, element or arrangement or groups thereof that enable information/data to be presented to a vehicle passenger (e.g. a person, a vehicle passenger, etc.). The output system 135 can present information/data to a vehicle passenger. The output system 135 can include a display. Alternatively, or in addition, the output system 135 may include a microphone, earphone, and/or speaker. Some components of the vehicle 100 may serve as both a component of the input system 130 and a component of the output system 135.

The vehicle 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, capture, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 in respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An indication system of a vehicle, comprising:
one or more processors;
a memory communicably coupled to the one or more processors and storing:
an orientation module including instructions that when executed by the one or more processors cause the one or more processors to, in response to receiving a notice about an occurrence of an event when the vehicle is opertating according to an automomous mode, determine a viewing orientation of a passenger in the vehicle according to at least one electronic input that indicates information about a physical position of the passenger within the vehicle including determining whether a line-of-sight of the passenger is directed to a secondary display panel which is positioned in relation to the passenger to shift the line-of-sight away from a primary direction of travel of the vehicle, and wherein the event is associated with at least one of a current location of the vehicle or operation of the vehicle,
wherein the orientation module further includes instructions to select at least one alerting device from available communication devices in the vehicle according to the viewing orientation by determining which of the available communication devices correspond with the viewing orientation of the passenger; and
a notice module including instructions that when executed by the one or more processors cause the one or more processors to control the at least one alerting device to communicate the notice to the passenger about the occurrence of the event.

2. The indication system of claim 1, wherein the orientation module further includes instructions to determine the viewing orientation of the passenger by analyzing the at least one electronic input to determine the line-of-sight of the passenger, wherein the electronic input specifies information from a seat circuit that indicates a seat position for a seat of the passenger, and
wherein the orientation module further includes instructions to select the at least one alerting device by selecting the at least one alerting device in place of a primary instrument panel when the orientation of the passenger indicates that the line-of-sight of the passenger is engaged with the at least one alerting device instead of the primary instrument panel.

3. The indication system of claim 2, wherein the orientation module further includes instructions to determine whether the viewing orientation of the passenger is directed at the secondary display panel by:
(i) determining that the line-of-sight of the passenger is oriented to view a side panel of the vehicle when the seat circuit indicates a side position for the seat,
(ii) determining that the line-of-sight of the passenger is oriented to view a rear panel of the vehicle when the seat circuit indicates a reverse position of the seat, and
(iii) determining that the passenger is oriented to view a roof panel of the vehicle when the seat circuit indicates a recline position of the seat.

4. The indication system of claim 3, wherein the orientation module further includes instructions to select the at least one alerting device according to the viewing orientation by:
(i) selecting the at least one alerting device to be a side display device that is located within a proximity of the side panel when the passenger is oriented to view the side panel,
(ii) selecting the at least one alerting device to be a rear display device that is located within a proximity of a rear portion of the vehicle when the passenger is oriented to view the rear panel, and
(iii) selecting the at least one alerting device to be a roof display device that is located in the roof panel when the passenger is oriented to view the roof panel.

5. The indication system of claim 1, wherein the orientation module further includes instructions to select the at least one alerting device by selecting embedded lighting of a passenger compartment of the vehicle when the viewing orientation indicates that the line-of-sight of the passenger is oriented away from the primary instrument panel.

6. The indication system of claim 5, wherein the embedded lighting is located in separately controllable sections throughout the passenger compartment, wherein the notice module further includes instructions to control the at least one alerting device by selectively lighting one or more of the sections of the embedded lighting to indicate the notice to the passenger and selectively varying a color and intensity of the one or more of the sections according to attributes of the notice, and
wherein the electronic input specifies information from an eye tracking device that indicates a present viewing area of the passenger in addition to information from a seat circuit to refine a determination of the present viewing area.

7. The indication system of claim 1, wherein the orientation module further includes instructions to determine the viewing orientation of the passenger by determining that the passenger is using a mobile device when the at least one electronic input identifies that the mobile device is in active use,
wherein the notice module further includes instructions to control the at least one alerting device by controlling the mobile device to display the notice when the viewing orientation indicates that the mobile device is in active use, and
wherein the orientation module further includes instructions to determine the viewing orientation of the passenger by determining that the passenger is viewing one of the communication devices that is displaying entertainment content.

8. The indication system of claim 2, wherein the orientation module further includes instructions to select the at least one alerting device by selecting an audio device when the viewing orientation indicates that the passenger is inattentive to the available communication devices within the vehicle as determined from a present viewing area of the passenger,
wherein the notice module further includes instructions to control the at least one alerting device to communicate the notice when the at least one alerting device is the audio device by controlling the audio device to produce audible sounds that alert the passenger to the notice, and wherein the audio device includes speakers that are positioned in the vehicle according to positions to which the seat is configured to move.

9. The indication system of claim 1, wherein the orientation module further includes instructions to receive the notice by receiving the notice while the vehicle is operating in an autonomous mode that includes the vehicle self-driving without receiving direct control input from a driver that is the passenger, and
wherein the notice module further includes instructions to control the at least one alerting device by controlling a seat of the passenger to move into a position in which the passenger is viewing a primary instrument panel of the vehicle when the notice is associated with a handover from the autonomous mode to a manual mode in which the passenger is to control the vehicle.

10. A non-transitory computer-readable medium storing instructions that when executed by one or more processors cause the one or more processors to:
in response to receiving a notice about an occurrence of an event when a vehicle is opertating according to an automomous mode, determine a viewing orientation of a passenger in the vehicle according to at least one electronic input that indicates information about a physical position of the passenger within the vehicle including determining whether a line-of-sight of the passenger is directed to a secondary display panel which is positioned in relation to the passenger to shift the line-of-sight away from a primary direction of travel of the vehicle, and wherein the event is an incident associated with at least one of a current location of the vehicle or operation of the vehicle;
select at least one alerting device from available communication devices in the vehicle according to the viewing orientation by determining which of the available communication devices correspond with the viewing orientation of the passenger; and
control the at least one alerting device to communicate the notice to the passenger about the occurrence of the event.

11. The non-transitory computer-readable medium of claim 10, wherein the instructions to cause the one or more processors to determine the viewing orientation of the passenger including instructions to analyze the at least one electronic input to determine the line-of-sight of the passenger, wherein the electronic input specifies information from a seat circuit that indicates a seat position for a seat of the passenger, and
wherein the instructions to cause the one or more processors to select the at least one alerting device includes instructions to select the at least one alerting device in place of a primary instrument panel when the orientation of the passenger indicates that the line-of-sight of the passenger is engaged with the at least one alerting device instead of the primary instrument panel.

12. The non-transitory computer-readable medium of claim 11, wherein the instructions to cause the one or more processors to determine the viewing orientation of the passenger include instructions to:
(i) determine that the line-of-sight of the passenger is oriented to view a side panel of the vehicle when the seat circuit indicates a side position for the seat,
(ii) determine that the line-of-sight of the passenger is oriented to view a rear panel of the vehicle when the seat circuit indicates a reverse position of the seat, and
(iii) determine that the passenger is oriented to view a roof panel of the vehicle when the seat circuit indicates a recline position of the seat, and
wherein the instructions to cause the one or more processors to select the at least one alerting device according to the viewing orientation include instructions to:
(i) select the at least one alerting device to be a side display device that is located on the side panel when the passenger is oriented to view the side panel,
(ii) select the at least one alerting device to be a rear display device that is located in a rear portion of the vehicle when the passenger is oriented to view the rear panel, and
(iii) select the at least one alerting device to be a roof display device that is located in the roof panel when the passenger is oriented to view the roof panel.

13. The non-transitory computer-readable medium of claim 10, wherein the instructions to cause the one or more processors to determine the viewing orientation of the passenger include instructions to determine that the passenger is using a mobile device when the at least one electronic input identifies that the mobile device is in active use,
wherein the instructions to cause the one or more processors to control the at least one alerting device include instructions to control the mobile device to display the notice when the mobile device is in active use,
wherein the instructions to cause the one or more processors to select the at least one alerting device include instructions to select an audio device when the viewing orientation indicates that the passenger is inattentive to the available communication devices within the vehicle, and wherein the instructions to cause the one or more processors to control the at least one alerting device to communicate the notice when the at least one alerting device is the audio device include instructions to control the audio device to produce audible sounds that alert the passenger to the notice.

14. A method of providing notifications within a vehicle, comprising:
in response to receiving a notice about an occurrence of an event when the vehicle is operating according to an autonomous mode, determining a viewing orientation of a passenger in the vehicle according to at least one electronic input that indicates information about a physical position of the passenger within the vehicle including determining whether a line-of-sight of the passenger is directed to a secondary display panel which is positioned in relation to the passenger to shift the line-of-sight away from a primary direction of travel of the vehicle, and wherein the event is an incident associated with at least one of a current location of the vehicle or operation of the vehicle;
selecting at least one alerting device from available communication devices in the vehicle according to the viewing orientation by determining which of the available communication devices correspond with the viewing orientation of the passenger; and
controlling the at least one alerting device to communicate the notice to the passenger about the occurrence of the event.

15. The method of claim 14, wherein determining the viewing orientation of the passenger includes analyzing the at least one electronic input to determine the line-of-sight of the passenger, wherein the electronic input specifies information from a seat circuit that indicates a seat position for a seat of the passenger, and wherein selecting the at least one alerting device includes selecting the at least one alerting device in place of a primary instrument panel when the orientation of the passenger indicates that the line-of-sight of the passenger is engaged with the at least one alerting device instead of the primary instrument panel.

16. The method of claim 15, wherein determining the viewing orientation of the passenger includes:
   (i) determining that the line-of-sight of the passenger is oriented to view a side panel of the vehicle when the seat circuit indicates a side position for the seat,
   (ii) determining that the line-of-sight of the passenger is oriented to view a rear panel of the vehicle when the seat circuit indicates a reverse position of the seat, and
   (iii) determining that the passenger is oriented to view a roof panel of the vehicle when the seat circuit indicates a recline position of the seat, and
wherein selecting the at least one alerting device according to the viewing orientation includes:
   (i) selecting the at least one alerting device to be a side display device that is located on the side panel when the passenger is oriented to view the side panel,
   (ii) selecting the at least one alerting device to be a rear display device that is located in a rear portion of the vehicle when the passenger is oriented to view the rear panel, and
   (iii) selecting the at least one alerting device to be a roof display device that is located in the roof panel when the passenger is oriented to view the roof panel.

17. The method of claim 14, wherein selecting the at least one alerting device includes selecting embedded lighting of a passenger compartment of the vehicle when the viewing orientation indicates that the line-of-sight of the passenger is oriented away from the primary instrument panel, and wherein the embedded lighting is located in separately controllable sections throughout the passenger compartment,
   wherein controlling the at least one alerting device includes selectively lighting one or more of the sections of the embedded lighting to indicate the notice to the passenger and selectively varying a color and intensity of the one or more of the sections according to attributes of the notice, and wherein the electronic input specifies information from an eye tracking device that indicates a present viewing area of the passenger in addition to information from a seat circuit to refine a determination of the present viewing area.

18. The method of claim 14, wherein determining the viewing orientation of the passenger includes determining that the passenger is using a mobile device when the at least one electronic input identifies that the mobile device is in active use, and
   wherein controlling the at least one alerting device includes controlling the mobile device to display the notice when the mobile device is in active use.

19. The method of claim 14, wherein selecting the at least one alerting device includes selecting an audio device when the viewing orientation indicates that the passenger is inattentive to the available communication devices within the vehicle, and wherein controlling the at least one alerting device to communicate the notice when the at least one alerting device is the audio device includes controlling the audio device to produce audible sounds that alert the passenger to the notice.

20. The method of claim 14, wherein receiving the notice includes receiving the notice while the vehicle is operating in an autonomous mode that includes the vehicle self-driving without receiving direct control input from a driver that is the passenger, and
   wherein controlling the at least one alerting device includes controlling a seat of the passenger to move into a position in which the passenger is viewing a primary instrument panel of the vehicle when the notice is associated with a handover from the autonomous mode to a manual mode in which the passenger is to control the vehicle.

* * * * *

UNITED STATES PATENT AND TRADEMARK OFFICE
CERTIFICATE OF CORRECTION

PATENT NO. : 10,166,996 B2
APPLICATION NO. : 15/428379
DATED : January 1, 2019
INVENTOR(S) : Mikiya Ishihara et al.

Page 1 of 1

It is certified that error appears in the above-identified patent and that said Letters Patent is hereby corrected as shown below:

In the Specification

Column 11, Line 16:
Insert --of-- as shown "out of a range"

Column 18, Line 49:
Replace "one" with "ones"

Column 25, Line 22:
Delete "can be configured" as shown "160 can"

In the Claims

Column 27, Line 22 Claim 1:
Replace "opertating" and "automomous" as shown "operating according to an autonomous"

Column 29, Lines 22-23 Claim 10:
Replace "opertating" and "automomous" as shown "operating according to an autonomous"

Signed and Sealed this
Fourteenth Day of May, 2019

Andrei Iancu
*Director of the United States Patent and Trademark Office*